United States Patent [19]

Kernick

[11] Patent Number: 4,489,371
[45] Date of Patent: Dec. 18, 1984

[54] SYNTHESIZED SINE-WAVE STATIC GENERATOR

[75] Inventor: Andress Kernick, Murrysville, Pa.

[73] Assignee: Westinghouse Electric Corp., Pittsburgh, Pa.

[21] Appl. No.: 371,089

[22] Filed: Apr. 23, 1982

[51] Int. Cl.³ .............................................. H02M 7/48
[52] U.S. Cl. ...................................... 363/41; 363/98; 363/132; 363/136
[58] Field of Search ............................. 363/17, 27–28, 363/40–43, 95–98, 131–132, 135–136, 139; 307/252 C, 252 P, 252 Q, 269, 271

[56] References Cited

U.S. PATENT DOCUMENTS

| | | | |
|---|---|---|---|
| 3,614,590 | 10/1971 | Kernick | 363/42 |
| 3,636,430 | 1/1972 | Kernick et al. | 363/41 |
| 3,648,150 | 3/1972 | Kernick et al. | 363/41 |
| 3,825,815 | 7/1974 | Gyugyi et al. | 307/105 |
| 4,241,395 | 12/1980 | Stacey et al. | 363/39 |

OTHER PUBLICATIONS

Geyer et al., "An Ideal Unit for a Modular Inverter", IECEC, Las Vegas, Nev., Sep. 23, 1970, pp. 140–152.
Kernick et al., "Static Inverter with Synchronous Output Waveform Synthesized by Time Optimal-Response Feedback", IEEE Transactions, vol. IECI-24, No. 4, Nov. 1977, pp. 297–305.
Geyer et al., "A Time-Optimal Response Inverter", Energy 70, 5th IECEC, Las Vegas, NV, Sep. 23, 1970, pp. 1–5.
Geyer et al., "Time Optimal Response Control of a Two-Pole Single Phase Inverter", Power Cond. Spec. Conf., JPL, Pasadena, CA, Apr. 19, 1971, pp. 1–9.

Primary Examiner—Peter S. Wong
Attorney, Agent, or Firm—C. M. Lorin

[57] ABSTRACT

An inverter bridge provided with a series-network in its diagonal including an inductor and an output transformer is feedback-controlled to generate a sine wave by reference to a sine wave reference signal and in a self-oscillatory fashion of the "bang-hang" type. The series-network operates during the "hang" phase as an active filter. Transistors are used on the high frequency side of the bridge and thyristors are used on the fundamental frequency side of the bridge. Provision is made for an AC source in parallel with the load, in which case feedback control is in response to the relative shares of the sources in the common load.

4 Claims, 10 Drawing Figures

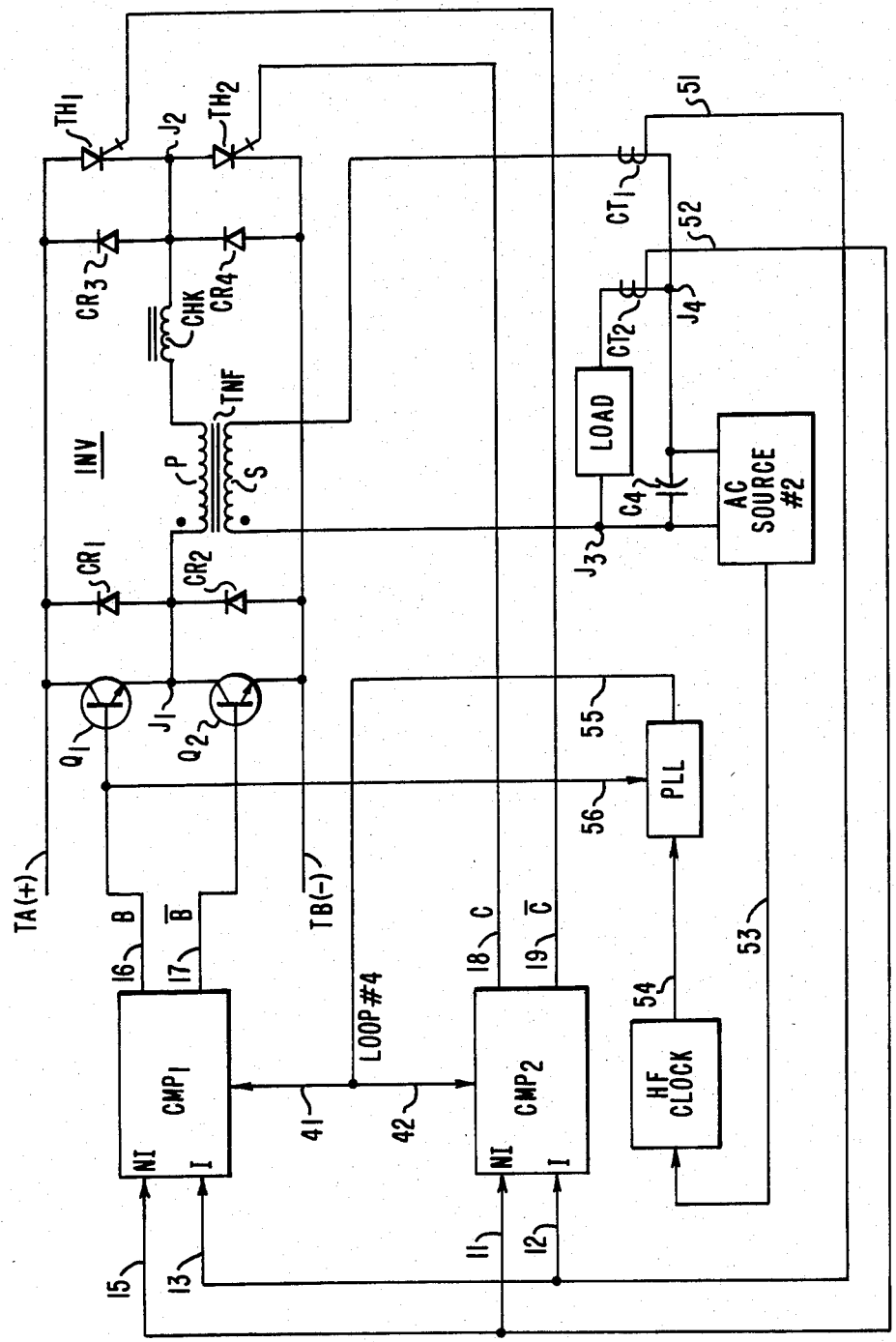

SYNTHESIZED SINE-WAVE STATIC GENERATOR

BACKGROUND OF THE INVENTION

The invention relates to solid state apparatus for the generation of AC power in general, and more particularly to a transistorized self-oscillatory static inverter utilizing feedback control for the synthesis of the outputted sine wave.

For many applications, in particular for an uninterruptible power supply (UPS) such as can be used for instance on a spacecraft, or in a computer facility, there is a need for an inverter power stage of low weight and cost, which is simple, quiet operating and rugged, that can deliver sufficient power with a good sine wave at an easily selectable frequency and an easily selectable output voltage. Another requirement is that the solid state devices be used to a full rating and with the smallest number of components in order to maximize the power output while minimizing cost. In this respect, the present invention provides for an improved transistorized static inverter power stage.

The present invention makes use of waveform synthesis with time-optimal-response by feedback control of the static switches of an inverter. This technique is essentially a self-oscillatory static inverter approach, known for its excellent transient response and active filtering which capabilities attenuate greatly any load or line changes.

The self-oscillatory static inverter technique consists in comparing, at the driving input of the static inverter, the outputted sine wave at the fundamental frequency with a reference sine wave of the same frequency. "Bang-bang" control is introduced via the comparator by causing switching of the system with the feedback error fluctuating alternately between an upper and a lower limit, or hysteresis limits, established above and below the reference voltage. Moreover, the lags of the system are anticipated in a second feedback control loop adding by differentiation a rate error to the error voltage of the first loop, which second feedback control loop is rendered insensitive to the fundamental frequency output voltage.

Due to the anticipatory function, switching events occur at unique times before error voltage alone reaches either of the said hysteresis limits. The effect is that potentially large overshoots, or undershoots, are easily contained, thereby adding stability and insuring proper control within the hysteresis limits. Bang-bang control according to the present invention also uses two more refinements in the form of additional control loops. A three-loop control results when the master comparator is provided with a derived reference voltage target which corrects for the fact that the average output voltage is likely not to lie half-way between the two hysteresis limits. A four-loop control provides additionally, for synchronous operation at a switching rate made an integral multiple of the output fundamental frequency. Self-oscillation normally implies asynchronous switching rate which results in apparent voltage modulation and audible noise as additional perturbing factors. The form of modulation produced through the feedback control system when so synchronized is identified as synchronous pulse frequency modulation (S.P.F.M.).

The bang-bang technique has been disclosed by applicant in U.S. Pat. Nos. 3,636,430 and 3,648,150.

The bang-bang feedback control method of waveform generation has been performed in the past with a four-transistor bridge like in the aforementioned Kernick patents. A variation with only two transistors has also been designed which involves a center-tap power stage and an Andre choke, as explained on page 299 in relation to FIG. 1 in "Static Inverter With Synchronous Output Waveform Synthesized By Time-Optimal-Response Feedback" by A. Kernick, D. L. Stechschulte and D. W. Shireman in IEEE Vol. IECI-24, No. 4, November 1977.

In the bang-bang mode, the static switching devices of the inverter bridge are alternately controlled for conduction, one under positive polarity and the other under negative polarity, so that the ON/OFF status of the devices be complementary, e.g., each device provides the complementary chopped sine wave modulation along the time axis for both half-cycles of the fundamental. The power transformer has its primary in series with a filter choke and this series network is across the opposite poles of the bridge. The secondary of the transformer outputs the fundamental sine wave from which feedback control is derived. Besides, as explained in the article, an output capacitor is mounted across the higher voltage winding, usually the secondary, and current in this capacitor is sensed so as to obtain anticipation.

The article of Kernick, Stechschulte and Shireman also describes a variation from the "bang-bang" control technique which is labelled by the authors as the time-optimal-response "bang-hang" approach. By "bang-hang" is meant that the static switches in the bridge are now controlled for three possible states, rather than the mere two opposite states ON/OFF defined in the bang-bang mode alternately. An additional state is provided corresponding to zero polarity drive on the series network, whereby both transistors connected to either the upper or the lower power rail are simultaneously turned ON, thereby to short-circuit the series combination of the filter choke and the primary of the transformer in the diagonal of the bridge. During such a no-polarity "hang" condition, the energy stored in the choke is either furnished to or augmented by the load in either a transient decay or a transient build-up used in the waveform synthesis of a segment of the time-optimally-controlled output. Choke-stored energy so used in an interchange with the load constitutes an active filter mode of operation.

It is also known from U.S. Pat. No. 3,614,590 of A. Kernick to synthesize a sine wave outputted at a fundamental frequency through a bridge of four transistors arranged in two half-bridges, or poles, across DC terminals. Two transistors of one pole are controlled for alternate conduction at said fundamental frequency, the two other transistors of the other pole are controlled in a pulse-width-modulation mode by feedforward control through the generation of a picket-width modulation type of programmed waveform applied to the transistors in accordance to a predetermined logic pulse generator controlled by a base oscillator of a frequency substantially higher than said fundamental frequency. With this approach, however, four transistors have been used of high rating and cost to achieve maximum power output. Moreover, feedforward is not as desirable as feedback control which allows response in the output to follow closely load and line changes, thereby improving the transient quality of the generated waveform.

The present invention provides an improved two-transistor inverter stage for the generation of AC power. The circuit according to the invention combines the use of transistors at their full rating and of thyristor devices. In place of SCR devices, it is also possible to use other thyristor types of high power, solid state devices, for instance GTO devices. The circuit is simple, rugged, and it permits to generate synchronously an excellent sine wave which can be easily controlled for desired output frequency and output voltage.

SUMMARY OF THE INVENTION

An inverter bridge including a filter choke and an output transformer in the diagonal thereof is feedback-controlled in a "bang-hang" fashion to synthesize a sine wave output voltage from a DC voltage link and in relation to a sine wave reference signal. The inverter bridge is provided with two transistors on the side of the time-optimal-response feedback control, whereas two thyristors are provided in the bridge which are alternatively controlled, once in each half-period of the fundamental, in response to a moment when an excessive energy transfer rate is demanded of the filter choke during the "hang" phase, or commutation stage of one thyristor and one transistor. The filter choke is performing active filtering during the "hang" phase.

When an AC source is to be connected in parallel with the load, feedback control combines signals representative of the inverter's share of the common load and of the load provided by the inverter power supply.

BRIEF DESCRIPTION OF THE DRAWINGS

FIG. 9 is a block diagram illustrating the embodiment of FIG. 8.

DETAILED DESCRIPTION OF THE INVENTION

Uninterruptible power supplies (UPS) are desirable whenever there is a need to maintain the quality and continuity of AC power regardless of utility transients or outages. The most generally used UPS consists of a rectifier-charger, a floating battery, a static inverter and an emergency static transfer switch (for direct connection of the load back to utility AC input) shown by FIG. 1.

Figure 1:
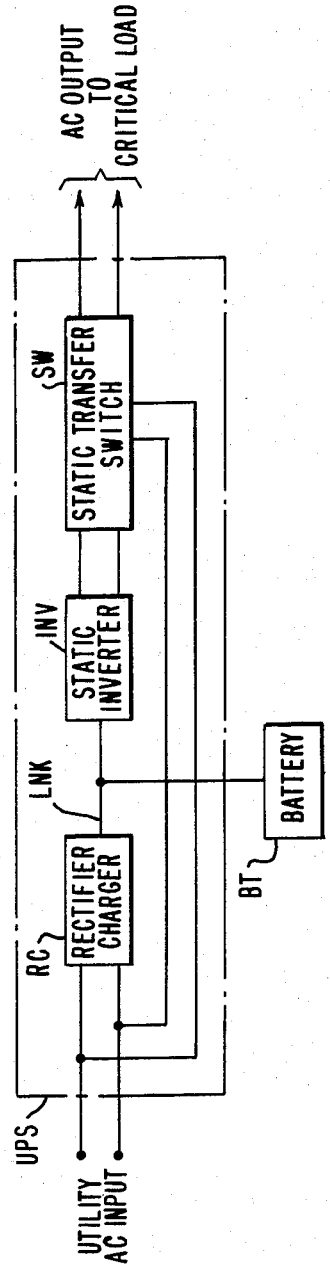
FIG. 1 is a schematic representation of an uninterruptible power supply (UPS)

Referring to FIG. 1, an uninterruptible power supply (UPS) generally is interposed between the load and the AC input from a utility power supply which may not satisfy the load requirements for stability regarding frequency, voltage and continuity. A rectifier charger RC and a battery maintain together the voltage continuity of the DC link LNK which is applied to a static inverter INV. A static transfer switch SW is used to supply utility AC power to the critical load only in the event output from the inverter INV is no longer possible. This system, which involves 1 to 15 kVA output, is often implemented with a thyristor squarewave driven ferroresonant transformer that has dominated static inverter design for small UPS because of its basic ruggedness and simplicity, while providing inherent filtering, voltage regulation and current limiting of the AC output.

Preferred to the ferroresonant transformer approach, transistorized inverter circuits have been introduced in the prior art. However, cost of a transistor switching device and its limited power rating have prevented general use of transistors, despite definite advantages such as: (1) efficiency increase for a UPS from 75% to 92%; (2) unit size and weight reduction to 50%; (3) 20 dB reduction in acoustic noise; (4) flexibility in voltage and frequency; (5) zero phase shift of output relative to line; and (6) better response to load changes.

New power transistors have been introduced on the market such as the D60T power transistor of Westinghouse Electric Corporation. As a result, there is a renewed interest in the transistorized inverter. The present invention achieves a combination of known techniques which permits a pair of low-cost thyristors to double the power output available from two power transistors. Such hybrid static inverters can achieve a clear-cut cost advantage over the ferroresonant approach since the latter has low efficiency requiring more battery and cooling, and it triples demand upon the amount of iron and copper, causing a large unit size and high sound level. In contrast, the performance of the hybrid static inverter according to the invention offers essentially all the benefits of the most advanced all-transistor inverters, but at a low cost.

It is now proposed to use time-optimal-response feedback control with a static inverter in a "bang-hang" fashion and to use two thyristors, instead of transistors, on the non-complementary side controlled at the fundamental frequency. As a result, the two transistors, which are controlled at a higher frequency than the fundamental frequency, can be used to their maximum rating while the thyristors, at low cost, double that rating.

For the purpose of the description hereinafter of the "bang-bang" time-optimal-response feedback control technique of a static inverter bridge and of its "bang-hang" control variation, the following publications are hereby incorporated by reference:

M. A. Geyer and A. Kernick: "Time Optimal Response Control of a Two-Pole Single-Phase Inverter", a paper at Powder Cond. Spec. Conf. JPL, Pasadena, CA, Apr. 19, 1971.

A. Kernick, D. L. Stechschulte and D. W. Shireman: "Static Inverter with Synchronous Output Waveform Synthesized by Time-Optimal-Response Feedback" in IEEE Transactions Vol. IECI-24, No. 4, November 1977.

M. A. Geyer and A. Kernick: "An Ideal Unit for a Modular Inverter", a paper at the First Western Space Congress, Part 1, Santa Maria, CA, Oct. 27, 1970, pp. 140–152.

M. A. Geyer and A. Kernick: "A Time-Optimal-Response Inverter" in Energy 70, 5th IECEC, Las Vegas, NV, Sept. 23, 1970.

It is known how to generate a sine wave voltage output with a transistorized static inverter bridge controlled by a comparator responsive to a feedback signal and a reference sine wave signal. The comparator is provided with hysteresis defining an upper and a lower limit about the reference sine wave signal, and the output signal from the comparator alternately causes the transistors of the inverter to provide buck and boost volt-seconds by properly polarizing the connection to the DC power supply, thereby maintaining a desired fundamental frequency output voltage. See for instance U.S. Pat. No. 3,648,150 of Kernick et al. As a refinement in time-optimal-response to feedback control of a second order output filter, it is known to add anticipatory feedback. See for instance U.S. Pat. No. 3,636,430, of Kernick et al.

This technique of sine wave generation involves self-oscillation through the feedback loop with a form of modulation in the control of the static switches of the inverter identified as pulse-frequency-modulation (PFM). The typical back and forth action of the comparator under feedback control upon the transistors results of a time-optimal-response as "bang-bang". See for instance: Energy 70, 5th IECEC, Las Vegas, NV, Sept. 23, 1970: "A Time-Optimal Response Inverter" by M. A. Geyer and A. Kernick, and a paper at Powder Cond. Spec. Conf., JPL, Pasadena, CA, Apr. 19, 1971: "Time Optimal Response Control of a Two-Pole Single-Phase Inverter" by M. A. Geyer and A. Kernick.

The "bang-bang" technique has been practiced with a full bridge inverter, namely with four transistors controlled in pairs, e.g. to complementary devices for each pole across the diagonal which includes the said series network. The full bridge "bang-bang" inverter preceded the later center-tap circuits with just two power transistors since unity coupling is inherent magnetically with single primary windings. It is in order to match the fast rate of switching required to follow the excursions back and forth, that transistors have been used.

It has been conceived that the "bang-bang" self-oscillatory transistor inverter could be improved by switching only one pole at a time and allowing intervals of conduction through a transistor in one pole with the conductive path being completed by commutation through the anti-parallel diode in the other pole. This technique is called the "bang-hang" mode of inverter control when one pole switches only at fundamental frequency. To this effect, a choke, serving as a filter element, is inserted into the diagonal or common path in series wth the primary of the output transformer. The purpose of the filter choke is to absorb voltage and store energy when the oncoming transistor is driven under one pole, namely the "bang" phase, and to discharge or receive energy as an active filter during the commutation stage, or "hang" phase thereof. As a result, the transistors can be used to a fuller degree, although at a somewhat higher switching rate. See for instance: the aforementioned Geyer and Kernick article of Apr. 19, 1971.

U.S. Pat. No. 3,614,590 of A. Kernick shows feedforward control of an inverter bridge for the neutralization, or cancellation, of selected low-order harmonics by switching sine wave in which the inverter bridge comprises two pairs of transistors at opposite ends of the common path defined by the primary of the output transformer and a filter choke. One pair is controlled for conduction by picket pulse-width modulation, whereas the other pair is clocked at the fundamental frequency of the outputted sine wave.

In the bang-bang type of self-oscillatory feedback-controlled inverter system, each of the four transistors is carrying the same power rating at the same switching rate, the operation being two-by-two alternately from one pole to the other. In the Kernick U.S. Pat. No. 3,614,590, only one pair of non-complementary transistors are changing their state of conduction at a high frequency switching rate. The second pair of non-complementary transistors is simply driven at the fundamental frequency. In contrast, with the inverter according to the present invention, feedback control is used in the "bang-hang" mode to create self-oscillation, while thyristors are substituted for the non-complementary transistors and these are controlled at the fundamental frequency. The transistors under "bang-hang" control are used to the maximum of their rating while the use of thyristors double the power rating while offering an appreciable cost reduction. Indeed, the thyristors may be silicon-controlled rectifiers (SCR's), or gate turn-off devices (GTO's), as well.

Figure 2:
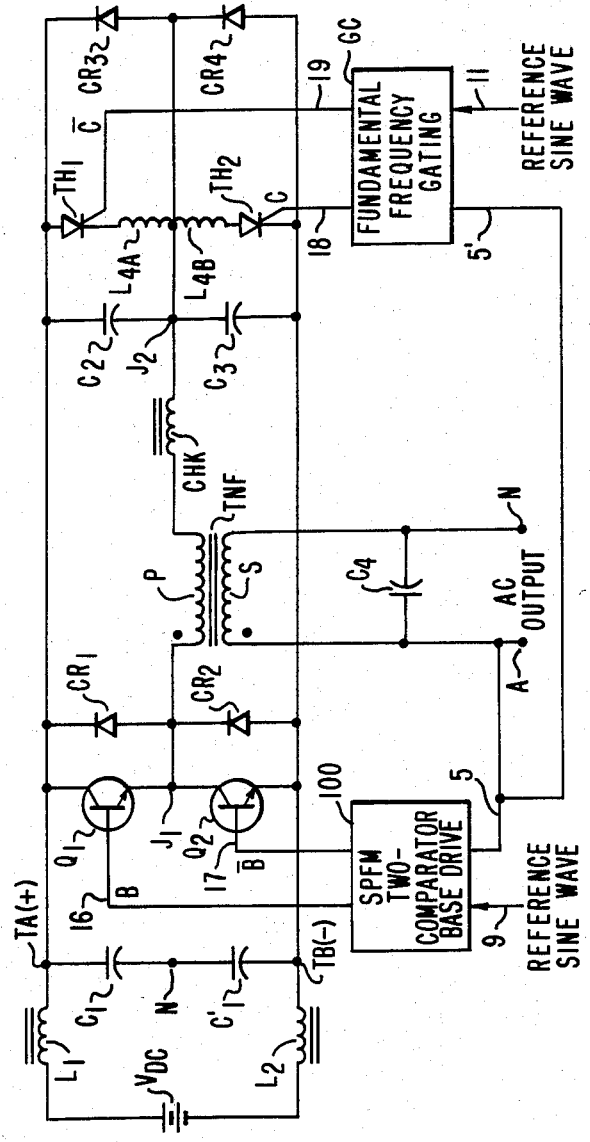
FIG. 2 shows the basic transistor inverter bridge according to the present invention, as can be used for a UPS like shown in FIG. 1.

Referring to FIG. 2, two transistors $Q_1$, $Q_2$ are connected in series between the terminals TA, TB of a DC link schematized by a DC power source #1 of voltage $V_{DC}$. Two electro-magnetic interference reduction chokes $L_1$, $L_2$ are inserted in circuit with each terminal (TA, TB). Diodes $CR_1$, $CR_2$ are connected in anti-parallel, one with transistor $Q_1$, the other with transistor $Q_2$. Across terminals TA and TB are connected two capacitors $C_1$, $C'_1$ defining at their common junction N a phantom neutral point useful in circuit analysis. The junction $J_1$ common to transistors $Q_1$, $Q_2$ is connected to one end of the primary winding of an output transformer TNF. Also, across DC terminals TA and TB are connected in series two thyristors $TH_1$, $TH_2$. Two coupled inductor halves $L_{4A}$ and $L_{4B}$ are inserted between the respective thyristors $TH_1$, $TH_2$ and a center point $J_2$. Capacitors $C_2$, $C_3$ are disposed on either side of junction $J_2$, each being connected to a corresponding terminal TA for $C_2$, TB for $C_3$. Rectifiers $CR_3$ and $CR_4$ are mounted in antiparallel to $TH_1$ and $TH_2$, respectively. A filter choke CHK is connected between junction $J_2$ and the second end of the primary winding P of transformer TNF. The secondary S of transformer TNF is connected to the load, or AC output AN. A capacitor $C_4$ is coupled across the output terminals AN. Output terminal A is for one of three phases, if a three-phase output ABC is used, N being the neutral line in such case.

As explained hereinafter, transistors $Q_1$ and $Q_2$ are gated on lines 16, 17 by a synchronous pulse frequency modulation circuit 100 which is responsive to a reference sine wave signal on line 9 and to a feedback signal on line 5 from the load. Thyristors $TH_1$ and $TH_2$ are gated at the fundamental frequency via lines 18 and 19 by a gating circuit GC which is also responsive to the reference sine wave signal on line 11, and to the signal of line 5, via line 5'.

Typically, the fundamental frequency is 50 or 60 Hertz. The DC power source is a conventional 260 V to 340 V battery when under extremes of rectifier charging and discharging by the inverter. The DC link so formed is symbolized by a battery of voltage $V_{DC}$. The AC output is typically 120 volts. Capacitors $C_1$, $C_1'$ are typically each of 7200 microfarads. Transistors $Q_1$, $Q_2$ are preferably of the type sold on the open market as D60T by Westinghouse Electric Corporation. Thyristors $TH_1$ and $TH_2$ form with capacitors $C_2$, $C_3$, inductances $L_{4A}$, $L_{4B}$ and antiparallel rectifiers $CR_3$, $CR_4$, an autocommutation pole for SCRs operating at the fundamental frequency. Therefore, they may be ordinary thyristors such as 2N5204. In the given example, the overall capacity of the hybrid bridge inverter just described is 5 kVA.

The SPFM circuit 100, like the conventional bang-bang circuit, contains an hysteresis comparator responsive to a sine wave reference signal, to the feedback signal $E_o$ from the output and to an anticipation signal thereof to generate a control signal of logic B on line 16 and of complementary logic $\overline{B}$ on line 17, to transistors $Q_1$, $Q_2$ as will be explained more fully by reference to FIG. 6 which is a diagrammatic representation of the overall control system. Circuit GC which controls the thyristors in accordance with the "bang-hang" technique contains a second hysteresis comparator responsive to the sine wave reference signal and to the feedback signal $E_o$ for the detection of a critical event most often occurring at the output towards the end of the half-period of the outputted sine wave. This second comparator generates a control signal of logic C on line 18 and of complementary logic $\overline{C}$ on line 19 to thyristors $TH_1$, $TH_2$, respectively, as will be explained more fully by reference to FIG. 6 hereinafter.

Figure 3:
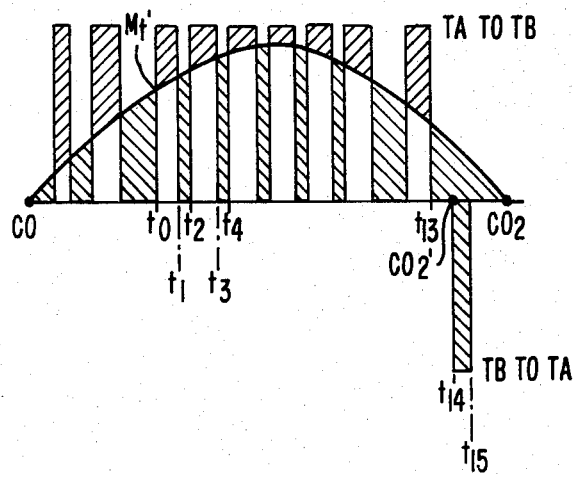
FIG. 3 depicts the volt-second drive imposed by transistors and thyristors illustrating the operation of the bridge of FIG. 2 according to the invention.

Referring to FIG. 3, the volt-seconds of drive generated above or below the desired output, referred to the primary winding of the power transformer, are illustrated with their increased, or decreased magnitude, along successive time intervals, such as ($t_0$–$t_1$) during which transistor $Q_1$ is "driving" the choke CHK and primary winding P in series in the bridge, whereas transistor $Q_2$ is "commutating" during alternate time intervals such as ($t_1$–$t_2$) (for the half-period shown, it being understood that during the subsequent half-period of the fundamental, the "driving" transistor will be $Q_2$ and transistor $Q_1$ will be the "commutating" transistor during the "hang" phase of control).

The operation of the circuit of FIG. 2 is as follows:

While thyristors $TH_1$ and $TH_2$ conduct alternately at the fundamental frequency, transistors $Q_1$ and $Q_2$ are controlled for conduction at a much higher frequency as shown in FIG. 3. When $Q_1$ and $TH_2$ are both conductive (accordingly $Q_2$ and $TH_1$ are not conducting), current is flowing from positive DC terminal TA through the primary winding of transformer TNF and through the choke CHK. As a result volt-seconds across the series network are established during such a time interval as $t_0$–$t_1$ of conduction of $Q_1$. The operative point is $M_t'$. At the same time, energy is accumulated within the choke CHK. During the subsequent time interval $t_1$–$t_2$, transistor $Q_1$ is turned OFF and transistor $Q_2$ is turned ON, while $TH_2$ is still ON, and $TH_1$ is still OFF. As a result, energy is delivered to the load by the choke CHK via a shorting path including $CR_2$ and $TH_2$. This is the "hang" phase of the "bang-hang" technique which will be explained in more detail by reference to FIGS. 4 and 5.

From FIG. 3, it appears however, that while the fundamental output sine wave following the volt-seconds has cross-overs such as $CO_1$, $CO_2$, the inversion between the "driving" phase with transistor $Q_1$ during one half period and the subsequent "driving" phase with transistor $Q_2$ during the subsequent half-period takes place at $CO_2'$ ($t_{14}$) which does not coincide with $CO_2$. In the same way, an inversion $CO_1'$ takes place between the driving role of $Q_2$ and the driving role of $Q_1$ which does not coincide with $CO_1$. This will be explained hereinafter by reference to FIGS. 5, 6 and 7 and when considering the operation of the second comparator of the circuit which controls thyristors $TH_1$, $TH_2$ (circuit GC). The occurrence of $CO_1'$ and $CO_2'$ is a function of the nature of the load, inductive or capacitive, as seen from the output of the transformer secondary S.

Figure 6:
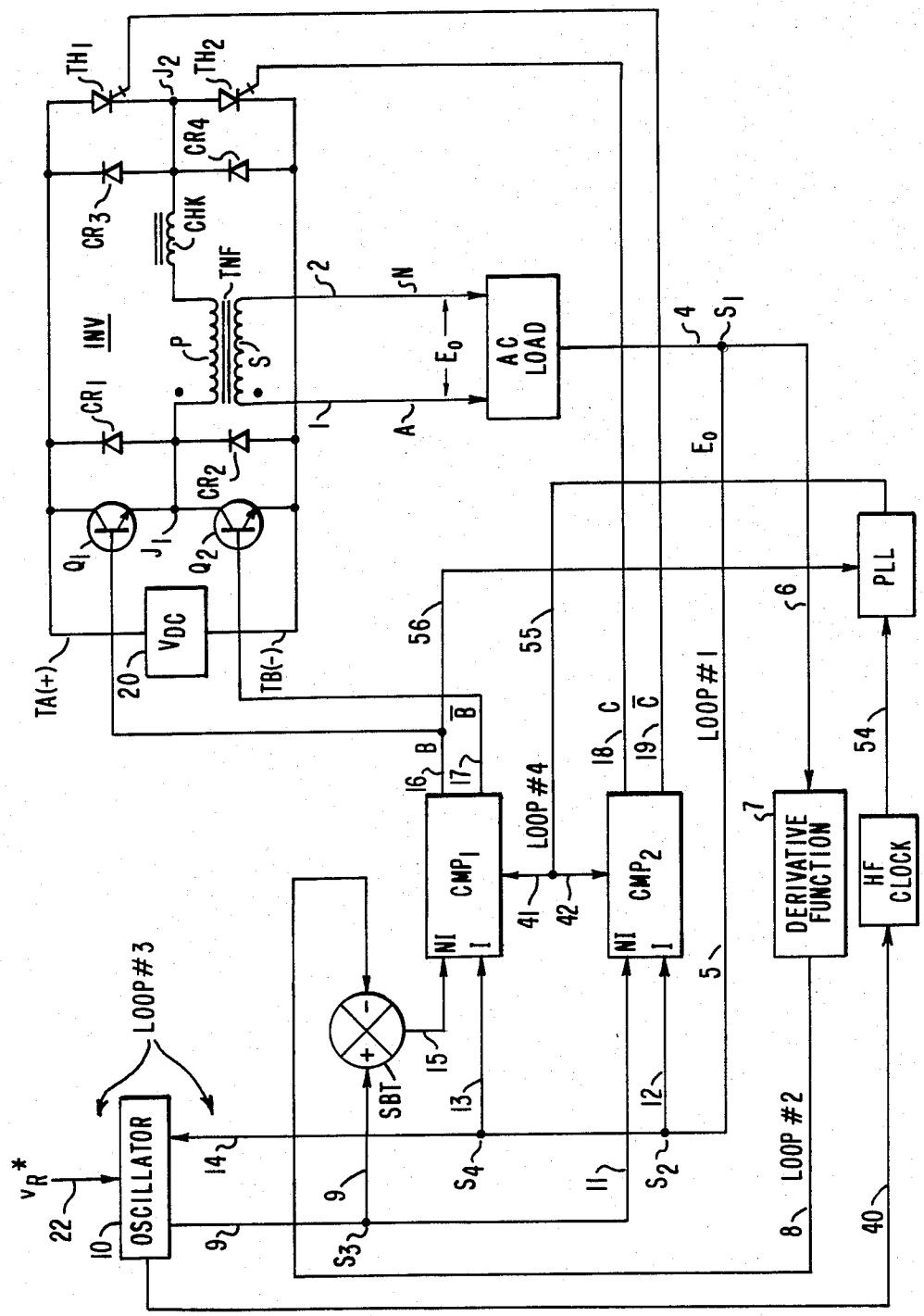
FIG. 6 is a block diagram of the "bang-hang" time-optimal-response waveform synthesizer according to the present invention.

FIG. 6 shows diagrammatically how circuits 100 and GC of FIG. 2 are controlling $Q_1$, $Q_2$ and $TH_1$, $TH_2$, respectively. For the sake of clarity, thyristors $TH_1$, $TH_2$ are illustratively symbolized as GTO devices. Transistors $Q_1$ and $Q_2$ are controlled by lines 16, 17 respectively, with corresponding logic signals B and $\overline{B}$ derived from the first comparator $CMP_1$. Thyristors $TH_1$ and $TH_2$ are similarly controlled via respective lines 18, 19 by respective logic signals C, $\overline{C}$ derived from a second comparator $CMP_2$. Both comparators receive, at one input, via respective lines 9, 11, the sine wave reference signal generated by an oscillator 10. A voltage reference signal $V_R$ on line 22 controls the magnitude of the outputted sine wave reference signal from oscillator 10. The second inputs of comparators $CMP_1$ and $CMP_2$ receive the output voltage feedback signal $E_o$ derived from the load via lines 4 and 5, and respective lines 13 and 12, respectively. Thus, is formed a first feedback loop (loop #1). The first input of comparator $CMP_1$ receives via line 15 a feedback signal combining in a subtractor SBT the reference signal of line 9, and another feedback signal which is derived, on line 8, from a derivative function generator 7, itself responding to the signal $E_o$ of lines 4 and 6. This second feedback signal, thus, belongs to a second feedback loop (loop #2). With the present illustration, line 15 from subtractor SBT into comparator $CMP_1$ goes into a non-inverting input, while line 13 goes into the inverting input of the comparator. Accordingly, the signal of line 9 from the oscillator 10 is connected to a positive side of subtractor SBT, whereas, the derivative signal of line 8 goes into the negative side thereof. The signal of line 9 from the oscillator goes also into the non-inverting input of comparator $CMP_2$, via line 11. Signal $E_o$ of line 5 is applied by line 12 to the inverting input of comparator $CMP_2$. It is observed here that, if the reference signal of line 9 were applied directly to the non-inverting input, the anticipation of loop #2 on line 8 could be used. To compensate the signal of line 13 to the inverting input through an ADDER, instead of the subtractor used for the non-inverting input of line 15. Signal $E_o$ is also applied for control to the oscillator 10 via line 14. The oscillator is controlled in relation to the reference signal $V_R^*$ of line 22 in order to adjust the magnitude of the reference signal of line 9. This is a feedback loop identified as loop #3.

A fourth feedback loop (loop #4) is provided for synchronization of the asynchronous self-oscillation. It includes a high frequency clock HFC synchronized at an integral multiple with the oscillator 10. A phase-locked loop PLL is responsive to the frequency on line 54 at the output of HFC and to the switching frequency of $CMP_1$ derived on line 56 from the B signal of line 16 (for instance). Circuit PLL controls via line 55 and respective lines 41, 42 the hysteresis of $CMP_1$ and $CMP_2$.

In theory, the derivative signal from generator 7 is preferably the second derivative of $E_o$. However, in the present control system, the first derivative of $E_o$ is sufficient in order to achieve a satisfactory anticipatory function with less EMI susceptibility. As a result, comparator $CMP_1$ effectively responds with the desired tightness in anticipation of any change in $E_o$ relative to the reference signal of line 9.

Figure 4A:
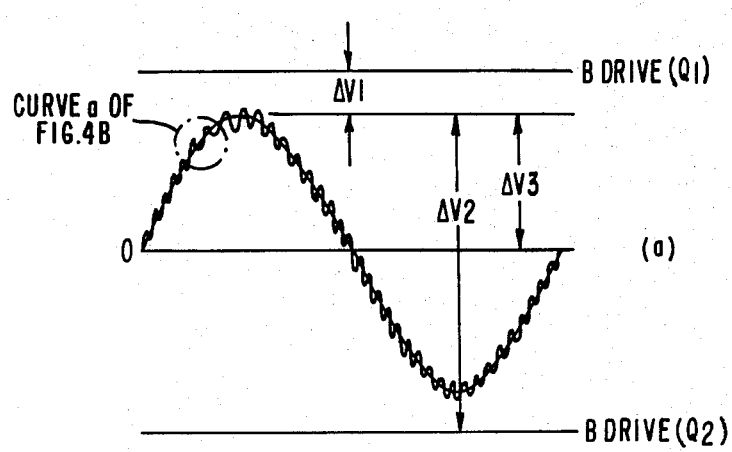
FIGS. 4A and 4B show the error over the reference sine wave and how it is used to control the static switches of the bridge of FIG. 2 in a "bang-hang" time-optimal-response feedback mode.
Figure 4B:
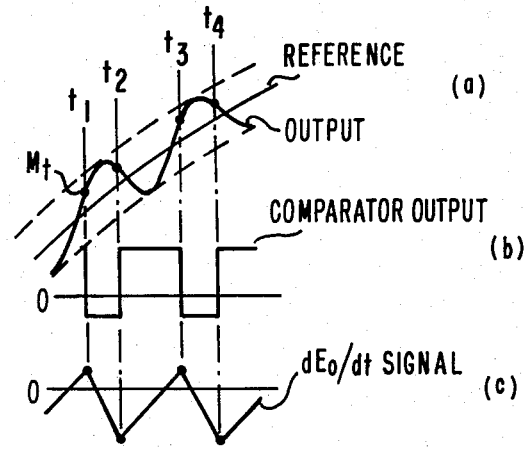
Figure 5:
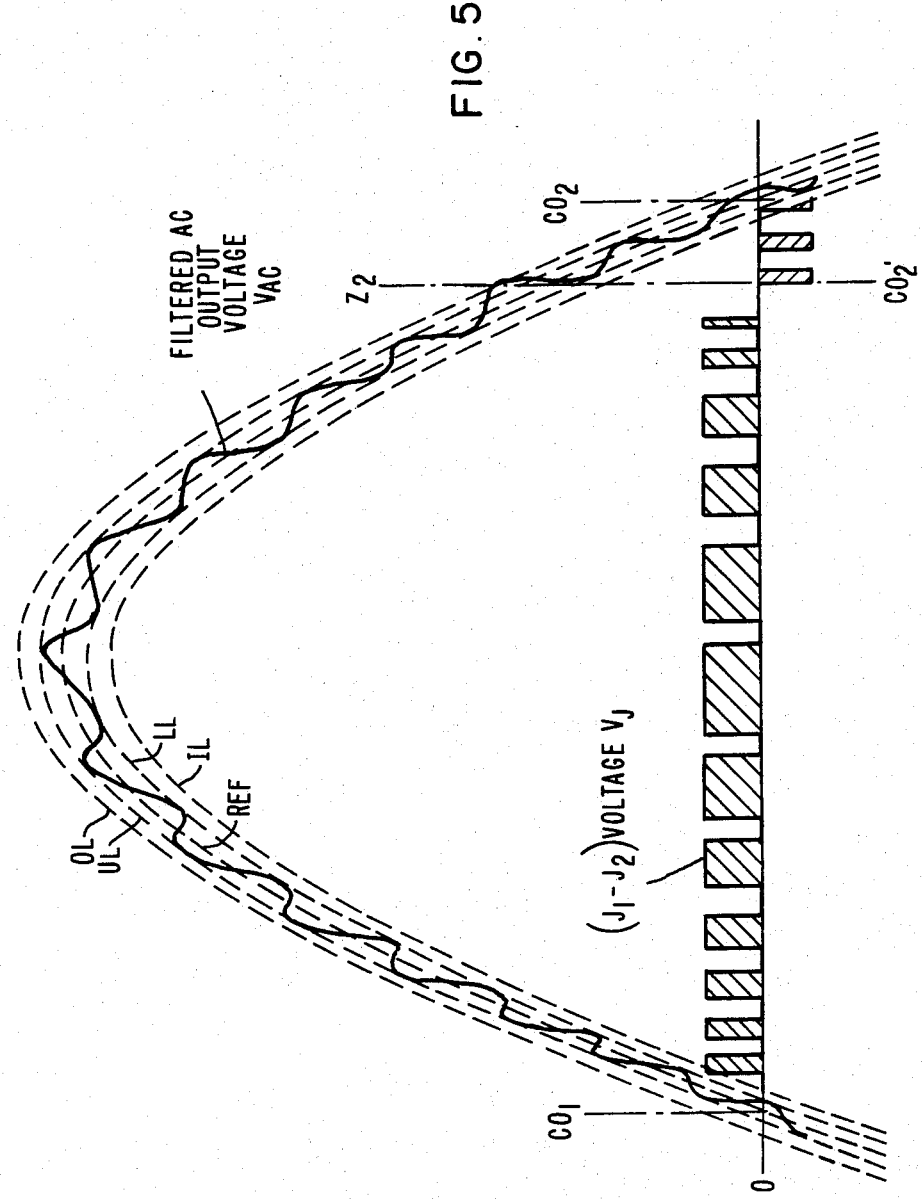
FIG. 5 is a curve illustrating the output waveform generated in accordance with the present invention.

The reference signal of line 9 is represented in solid line in FIGS. 4A, 4B as an ideal sine wave about which $E_o$ is deviating within controlled limits. FIG. 4B represents an enlarged portion of the curve of FIG. 4A which is identified as curve (a). Curve (a) is associated in FIG. 4B with curve (b) representing the signal at the output of comparator $CMP_1$, and with curve (c) representing the derivative signal of line 8 at the negative input of subtractor SBT. Comparators $CMP_1$ and $CMP_2$ both have controlling hysteresis levels which establish respective upper and lower limits. Reference should also be had to FIG. 5 which depicts a three-level waveform synthesized by the circuit of FIG. 2 or of FIG. 6. FIG. 5 also shows the upper and lower controlling limits UL and LL which hold comparator $CMP_1$, while nested outside are greater limits OL and IL established for comparator $CMP_2$. As illustrated by operative point $M_t$ on the curve of FIG. 4B, due to anticipation by loop #2, the increasing error in magnitude is augmented by the gradient signal of curve (c) so as to reach the upper limit UL. As a result, the action of transistor $Q_1$ is interrupted by turning $Q_1$ OFF. Similarly, transistor $Q_2$ will be turned OFF when in the next time interval $Q_2$ being ON could cause limit LL to be exceeded. Due to the anticipatory loop these controls are taken early in order to remain within the deadband.

For the operative point $M_t$ of FIG. 4B, when at time $t_1$ the gradient under the anticipatory feedback loop (loop #2) is increased by the amount indicated on curve (c), the anticipation is that $M_t$ will eventually reach the upper limit UL. Therefore, the maximum of curve (a) touching the upper limit UL some time later between $t_1$ and $t_2$ has been properly anticipated. As a result, transistor $Q_2$ is switched ON and transistor $Q_1$ is switched OFF. Bucking current action (the "hang" phase) is, then, exerted from time $t_1$ to time $t_2$. This action tends to bring the operative point $M_t$ back from such upper limit UL. At time $t_2$, transistor $Q_2$ is turned OFF while transistor $Q_1$ is turned ON, despite the positive error shown in FIG. 4B for such instant $t_2$, because the error added to the negative gradient shown by curve (c) adds up to a sum on line 15 after the subtractor SBT which will in fact indicate reaching the lower limit LL. It is as a result of such anticipation that at time $t_2$ transistor $Q_1$ is turned ON and transistor $Q_2$ is turned OFF. Boosting action is now taking place which tends to push back the operative point $M_t$ around and towards the upper limit UL.

As shown in FIG. 5, after control of $Q_1$, $Q_2$ at time $t_1$, the "hang" phase follows until time $t_2$. This second phase ends when $Q_2$ is turned OFF and the conduction of $Q_1$ is restored. Such multiple switchings of $Q_1$ and $Q_2$ are performed within each half-cycle of the associated thyristor pole, $TH_1$ in the instance just described. During each such half-period of the output fundamental, comparator $CMP_2$ exercises one or the other of two hysteresis limits OL and LL, just once in the half-period. Most of the time, the fast reaction of the anticipation loop #2 will maintain control within the deadband defined by limits UL and LL. However, in the sharply descending portion of the sine wave, normally on the backside thereof, the duration of the conduction of transistor $Q_1$ becomes quite short relative to the subsequent conduction of transistor $Q_2$. This means that a commutation phase time interval during which choke CHK is allowed to dissipate its energy, becomes much longer than the storing phase time interval. Therefore, at some time marked $Z_2$ on FIG. 5, namely before the cross-over point $CO_2$ of the outputted waveform, the inductive load as seen from the inverter will prevail over the dissipated energy, causing comparator $CMP_2$ to intervene when the feedback signal $E_o$ will tend to exceed the outside limit OL at a time $t_{14}$ as shown on FIG. 3. As a result the logic of lines 18 and 19 is inverted. $TH_1$ becomes the complementary switch rather than $TH_2$, with regard to transistors $Q_1$, $Q_2$. This also means that $Q_1$ will be conducting during the commutation phase, and $Q_2$ will be conducting during the storing phase in relation to choke CHK. Therefore, comparator $CMP_2$ no longer prevails over comparator $CMP_1$, and switching between $Q_1$ and $Q_2$ is now proceeding with $Q_2$ as the "driver" transistor (square pulses downward in FIG. 5) from a virtual cross-over $CO_2'$ ahead of the actual cross-over point $CO_2$. Similar reasoning is applicable to the following half-cycle, not shwon for the sake of clarity. It is also observed that, while the load has been assumed to be resistive when the operating point $M_t$ follows the sharply descending portion of the curve towards $CO_2$, if the net load were inductive the effect would be the reversed, namely having passed point $CO_2$ the opposite outside limit IL would be reached at a point somewhere after the cross-over point $CO_2$. Then, reversal in the operation of thyristors $TH_1$, $TH_2$ would take place at a point $CO_2'$ located beyond $CO_2$.

During the "driving phase" energy from the DC link voltage source is accumulated into the series network, mainly into inductor CHK. During the "commutating" phase, the series network is in fact divorced from the DC link voltage source, however, it still is under the influence of the load. Depending upon the existing power factor, energy will be added to the series network, or be subtracted therefrom. The series network is in fact working as an active filter, taking upon any occurring discrepancy with the load, thereby improving the quality of the outputted synthesized waveform. Reference can be had, in this respect to U.S. Pat. No. 4,241,395 and No. 3,825,815 which disclose active filtering in a transistorized inverter circuit. The two patents are hereby incorporated by reference.

Further, it is observed that comparator $CMP_2$ is not given any anticipatory input for two reasons: (1) gradient of error voltage would cause frequent undesired switchings as a result of "bang-bang" operation by the thyristor pole; and (2) the gradient of error voltage tends to be small anyway, just prior to a legitimate switching event for the thyristor pole.

As a result of the ON/OFF periods of transistor $Q_1$ in relation to thyristor $TH_2$, and conversely the OFF/ON periods of transistor $Q_2$ during the opposite half-period in relation to thyristor $TH_1$, a sine wave at the fundamental frequency defined by the reference signal of line 9 is established across the load, e.g. between the terminals A,N of the secondary S of transformer TNF of FIG. 2 or 6.

Figure 7:
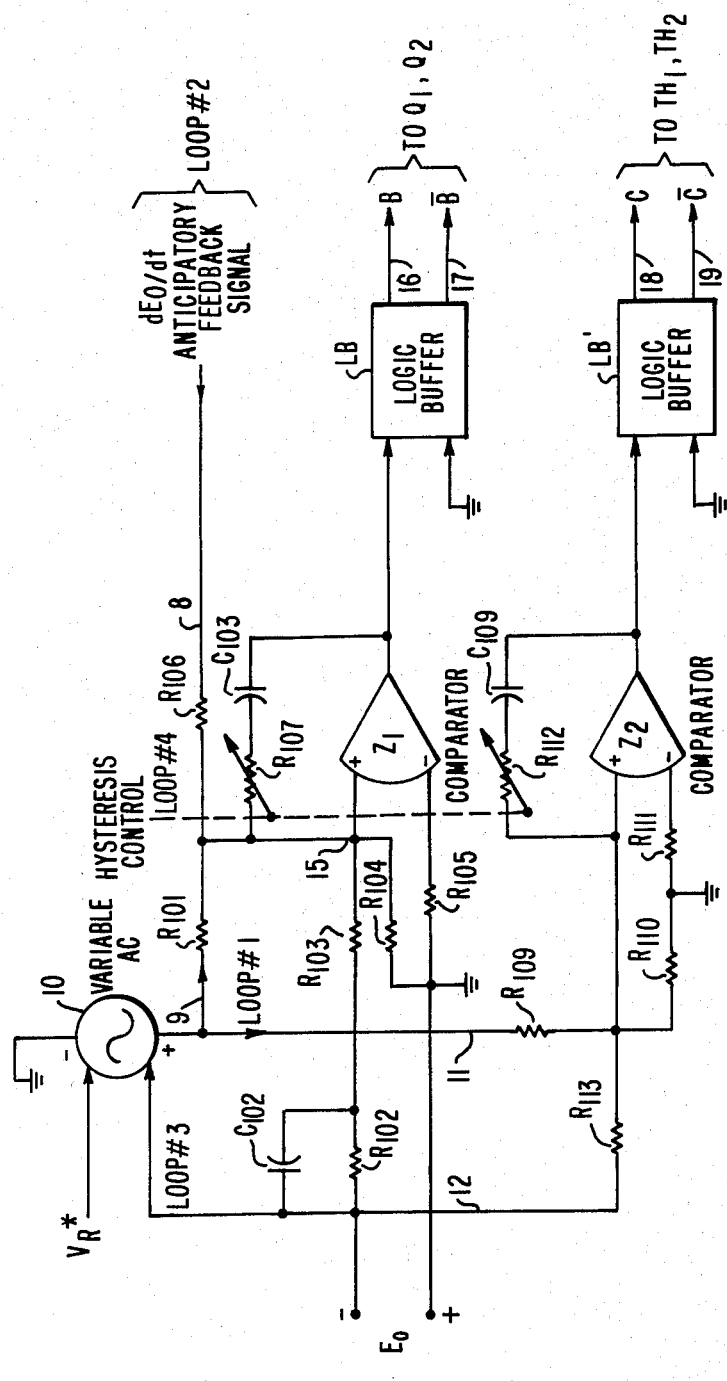
FIG. 7 is specific circuitry illustrating the internal organization of the "bang-hang" waveform synthesizer of FIG. 7.

The periods of conduction and non-conduction of transistors $Q_1$, $Q_2$ are shown in FIG. 5 along the horizontal axis of the output wave or fundamental. FIG. 7 shows the two master comparators $CMP_1$ and $CMP_2$, illustratively including one a logic buffer LB having two outputs for transistors $Q_1$, $Q_2$, the other a logic buffer LB' having two outputs for thyristors $TH_1$, $TH_2$. These buffers are associated with corresponding logic comparators $Z_1$ for $Q_1$, $Q_2$ and $Z_2$ for $TH_1$, $TH_2$. $CMP_1$ establishes the logic B, or $\overline{B}$ amplifying the output of $Z_1$. Similarly, $CMP_2$ establishes the logic C, or $\overline{C}$ amplifying the output of $Z_2$. When the logic state BC exists between $Z_1$ and $Z_2$, the "boost" mode is applied, e.g. transistor $Q_1$ and thyristor $TH_2$ are ON. Conversely, when the logic $\overline{BC}$ exists between $Z_1$ and $Z_2$, the "buck" mode is applied, e.g. transistor $Q_2$ and thyristor $TH_1$ are ON. FIG. 5 illustrates mainly the "boost" mode interrupted by logic states $\overline{BC}$ for "hold".

Figure 8:
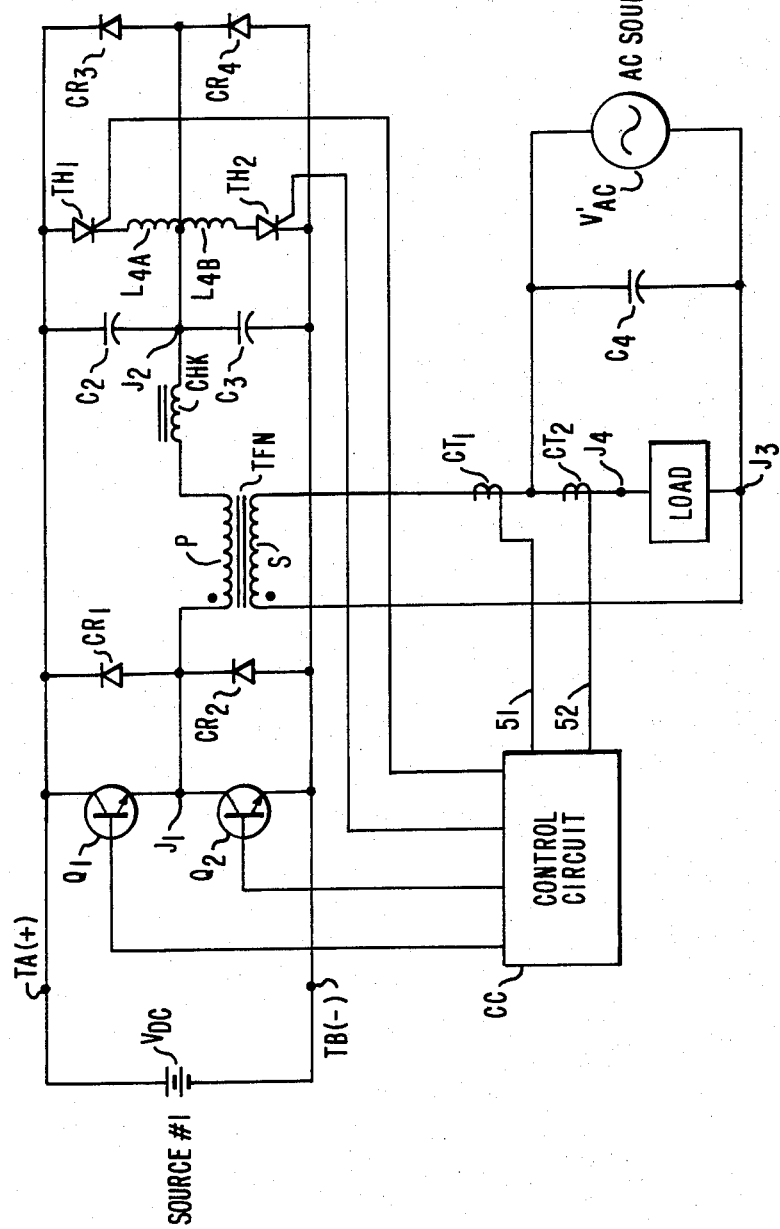
FIG. 8 is another embodiment of the invention in which, in contrast to feedback voltage control as illustrated in FIG. 2, feedback current control is used to provide a "bang-hang" waveform synthesizer according to the present invention as pertaining to paralleling of inverter units or inverter units with utility AC sources.

The invention is applicable to a situation where another source of AC power is connected in parallel with the hybrid static inverter INV of FIG. 2, the load being inserted so as to be shared in common by both according to the illustrative diagram of FIG. 8. Referring to FIG. 8, AC power source #2 of voltage $V'_{AC}$ drives together with inverter INV the common load having a filter capacitor $C_4$ in parallel thereto. A current transformer $CT_1$ is provided a control circuit CC (which symbolizes circuits 100 and GC of FIG. 2) responds to the current signal outputted on line 51 which is substituted, in this instance, for the AC output signal $E_o$ of FIG. 2. This is the equivalent of feedback loop #1 described in the first embodiment. Also, in this instance, the feedback loop #3 is not used. Moreover, the feedback loop #2 is not used after either, thus, making the current-controlled inverter paralleling system a system of the first-order. Time optimal response is achieved without anticipation. Feedback loop #4, however, is retained in order to make transistor switching events synchronous with the occurrence of each half-period of the output fundamental, which has now been made dependent upon the added AC power source #2. In this regard, control circuit CC is made responsive to a current signal derived, on line 52, to a current transformer $CT_2$. This current signal is, thus, representative of the current drawn as a result of source #2 voltage. Source #2 imposes the voltage on the load. Accordingly, $CT_2$ is a reference defining via line 52 the required contribution of source #1 to the load, while $CT_1$ provides a feedback signal, via line 51, indicating whether there is a want or excess in the contribution of source #1 to the load. It appears that the current signals of lines 51 and 52 indicate, respectively, the share of the secondary S of transformer TNF e.g. of inverter INV, and the reference fraction of the common load. The inverter current share times the output voltage establishes the volt-ampere and power factor loading of the inverter. The load determines its own current requirement from the output voltage available from the parallel source #2. The inverter participates in this load current in phase to a certain fractional magnitude, while the filter capacitor $C_4$ tends to minimize the "bang-hang" ripple current which would enter the parallel AC source #2.

Referring to FIG. 9, a block diagram like the one of FIG. 6 illustrates the organization of the control circuit of FIG. 8. For the sake of clarity thyristors $TH_1$, $TH_2$ are symbolized as GTO devices. The secondary S of transformer TNF is in parallel with the AC source #2 across the terminal points $J_3$, $J_4$ of the load, and capacitor $C_4$ in parallel across source #2. The output of current transformer $CT_1$, on the output of secondary S, is applied via line 51 to one input of each comparator, $CMP_1$ and $CMP_2$. Similarly, the output of current transformer $CT_2$ on the load current used as the sine wave current reference signal, is applied via line 52 to the second input of each comparator, $CMP_1$ and $CMP_2$. The hysteresis of comparator $CMP_2$ is chosen to be substantially larger than the hysteresis of comparator $CMP_1$, thereby causing a reversal in the logic C, $\overline{C}$ once in the half-period, while insuring at the same time a much higher frequency of switching of the logic B, $\overline{B}$ from the first comparator $CMP_1$.

The fourth feedback loop (loop #4) which insures synchronization, as taught by the aforementioned prior art, is obtained in this second embodiment with a high frequency clock of a frequency matching the alternances of comparator $CMP_1$ and which is synchronized by line 53 at an integral multiple of the voltage of the AC source #2. The master frequency thus derived on line 54 is compared in a phase-locked-loop circuit PLL with the output frequency of comparator $CMP_1$, given for instance by logic B derived on line 56. Circuit PLL adjusts, via line 55 and respective lines 41, 42, the hysteresis of comparators $CMP_1$ and $CMP_2$.

From a comparison of the "bang" and "hang" phases associated with the filter choke CHK and the primary P of the output transformer TNF, it is again observed, in the instance of this second embodiment of the invention, that the inverter bridge which causes the transformer to output at its secondary S the desired synthesized sine wave, operates through the series-network in the diagonal with an active filter capability effective between the "driven" and the "commutation" phase of transistors $Q_1$, $Q_2$. In this regard, reference may be had to U.S. Pat. No. 4,241,395 of E. J. Stacey and A. Kernick and No. 813,825,815 of L. Gyugyi et at. which disclose and explain two basic modes of active filtering in a transistorized inverter circuit. For the purpose of the present description, the two U.S. Pat. No. 4,241,395 and No. 3,825,815 are hereby incorporated by reference.

I claim:
1. A sine wave power generator comprising:
a DC link voltage source;
an AC load;
an inverter bridge connected between said DC link voltage and said load;
a series network in the diagonal of said bridge including an inductor and an output transformer; said output transformer being connected to said load;
a filter capacitor operative with said load;
a first comparator for alternately switching into conduction a first pair of power switches of said bridge on two opposite poles thereof and at one end of said series network;
a second comparator for alternately switching into conduction a second pair of power switches of said bridge on two opposite poles thereof and at the other end of said series network; and
feedback means responsive to the difference between the output of said output transformer and a sine wave reference signal for controlling said first comparator successively in a driving mode and in a commutation mode in relation to one power switch of said second pair; said driving mode being effective with one of the power switches of the first pair, said commutation mode being effective with the other of the power switches of the first pair;

said first and second comparators each having an hysteresis establishing an upper and a lower limit in the response to said difference in either direction relative to said reference signal;

the driving mode for an associated one of the power switches of the first pair being operative toward and away from one of said upper and lower limits of the first comparator;

thereby to synthesize a sine wave at the output of said transformer which is representative of said sine wave reference signal;

with the additional provision of a synchronizing feedback loop responsive to a signal representative of the switching frequency of said first comparator and to a clock signal of a frequency which is an integral multiple of the frequency of said sine wave reference signal for synchronizing the operation of said first and second comparators.

2. A sine wave power generator comprising:

a DC link voltage source;

an AC load;

an inverter bridge connected between said DC link voltage and said load;

a series network in the diagonal of said bridge including an inductor and an output transformer; said output transformer being connected to said load;

a filter capacitor operaive with said load;

a first comparator for alternately switching into conduction a first pair of power switches of said bridge on two opposite poles thereof and at one end of said series network;

a second comparator for alternatively switching into conduction a second pair of power switches of said bridge on two opposite poles thereof and at the other end of said series network; and with at least one second AC source being connected in parallel with said load; said load sharing current from said output transformer and from said second AC source;

a current representative signal being derived from the current in said load as a sine wave reference signal;

feedback means responsive to the difference between the output of said output transformer and a sine wave reference signal for controlling said first comparator successively in a driving mode and in a commutation mode in relation to one power switch of said second pair; said driving mode being effective with one of the power switches of the first pair, said commutation mode being effective with the other of the power switches of the first pair;

said first and second comparators each having an hysteresis establishing an upper and a lower limit in the response to said difference in either direction relative to said reference signal;

the driving mode for an associated one of the power switches of the first pair being operative toward and away from one of said upper and lower limits of the first comparator;

thereby to synthesize a sine wave at the output of said transformer which is representative of said sine wave reference signal.

3. A sine wave power generator according to claim 2 with the additional provision of a synchronizing feedback loop responsive to a signal representative of the switching frequency of said first comparator and to a clock signal of a frequency which is an integral multiple of the frequency of said sine wave reference signal for synchronizing the operation of said first and second comparators.

4. The sine wave power generator of claim 2 with said series network performing active filtering for the output of said transformer during said commutation modes.

* * * * *